United States Patent [19]
Choi

[11] Patent Number: 5,883,453
[45] Date of Patent: Mar. 16, 1999

[54] HEMISPHERICAL DYNAMIC PRESSURE BEARING

[75] Inventor: Jin-Seung Choi, Seoul, Rep. of Korea

[73] Assignee: Samsung Electronics Co., Ltd., Suwon, Rep. of Korea

[21] Appl. No.: 966,557

[22] Filed: Nov. 10, 1997

[30] Foreign Application Priority Data

Nov. 25, 1996 [KR] Rep. of Korea .................. 1996 57196

[51] Int. Cl.$^6$ ............................ H02K 5/16; H02K 5/167; F16C 32/06
[52] U.S. Cl. .............................................. 310/90; 384/108
[58] Field of Search ........................ 310/90, 90.5, 67 R; 384/108, 109, 110, 219, 225, 248, 249

[56] References Cited

U.S. PATENT DOCUMENTS

| | | | |
|---|---|---|---|
| 2,919,960 | 1/1960 | Whitney | 384/108 |
| 4,095,855 | 6/1978 | Fox | 384/109 |
| 4,664,243 | 5/1987 | Martin | 384/320 |
| 5,689,146 | 11/1997 | Cheever | 310/90 |
| 5,709,480 | 1/1998 | Hong | 384/108 |
| 5,760,509 | 6/1998 | Chung | 310/90 |
| 5,783,882 | 7/1998 | Brezoczky et al. | 310/254 |

*Primary Examiner*—Clayton LaBalle
*Attorney, Agent, or Firm*—Burns, Doane, Swecker & Mathis, L.L.P.

[57] ABSTRACT

A hemispherical dynamic pressure bearing includes a supporting shaft, a fixed hemisphere fixed on a first end of the supporting shaft, and a sliding hemisphere slidably disposed on a second end of the supporting shaft. A spring is disposed on the supporting shaft for biasing the sliding hemisphere away from the fixed hemisphere. A bushing has first and second hemispherical grooves in which the fixed and sliding hemispheres are disposed, respectively. A gap adjuster is connected to the shaft for adjusting a gap between each hemisphere and its respective groove. The gap adjuster applies a variable force against the sliding hemisphere to compress the spring.

9 Claims, 4 Drawing Sheets

HEMISPHERICAL DYNAMIC PRESSURE BEARING

BACKGROUND OF THE INVENTION

(1) Field of the Invention

The present invention relates to a hemispherical dynamic pressure bearing and, more particularly, to a semi-spherical bearing having gap adjusting means for adjusting a gap between a pair of hemispheres disposed facing one another so that the bearing operates in an optimal state.

(2) Brief Description of Related Art

Generally, a dynamic pressure bearing comprises a supporter, and a rotating member eccentrically and rotatably supported by the supporter. Pressure is formed by lubricant fluid within a gap defined between the supporter and the rotating member so as to enhance the rotation of the rotating member.

Particularly, a hemispherical dynamic bearing is designed such that a portion thereof for supporting the rotating member is hemispherically-shaped so as to simultaneously support a radial load and a thrust load.

Accordingly, since there is no need for a plurality of bearings for supporting each load, it is possible to make the bearing compact. In addition, when using air as the fluid for forming lubricant pressure for the dynamic bearing, a seal member is not required such that the bearing can be made in a more compact state. This compact bearing is suitable for use in a motor used in electronic products.

Referring to FIG. 4, there is shown a sectional view illustrating a motor where a conventional hemispherical dynamic pressure bearing for rotating a multi-faceted mirror used in a laser scanning unit is provided.

The multi-faceted mirror 1 reflects laser beams, scanned by a semiconductor laser, to a photoconductive drum. The motor 2 is employed to rotate the multi-faced mirror 1.

As shown in FIG. 4, the multi-faceted mirror 1 is coupled to a rotating member 1a, while the rotating member 1a is coupled to a bushing 8 of a hemispherical dynamic pressure bearing 9.

There is provided a frame 2a disposed under the motor 2. A supporting shaft 3 is coupled on a center of the frame 2a and extends upward. A sliding hemisphere 5 is slidably disposed on the supporting shaft 3 which extends through an axial hole 5a of the sliding hemisphere 5, while a fixed hemisphere 4 is snugly disposed on the supporting shaft 3 which extends through an axial hole 4a of the fixed hemisphere 4. The fixed hemisphere 4 is located under the sliding hemisphere 5.

The sliding and fixed hemispheres 5 and 4 are arranged such that their planar surfaces are directed upward and downward, respectively. A sleeve 6 is disposed around the supporting shaft 3 between the sliding and fixed hemispheres 5 and 4 so as to establish the distance between the hemispheres 5 and 4. That is, the hemispheres 5 and 4 closely contact the sleeve 6 such that the sliding hemisphere 5 is spaced away from the fixed hemisphere 4 by a longitudinal length of the sleeve 6.

A fixing ring 7 is coupled around the supporting shaft 3 above the sliding hemisphere 5 such that it can fix the hemispheres 5 and 4, and the sleeve 6.

The hemispheres 5 and 4 and the sleeve 6 are enclosed by the bushing 8. That is, the bushing 8 is provided at its upper and lower ends with hemispherical grooves 8b and 8a complemental to the hemispheres 5 and 4, respectively, and a communicating hole 8c connecting the hemispherical grooves 8b and 8a to each other. The sleeve 6 is positioned in the communicating hole 8c so that it can rotate with respect to the hemispheres 5 and 4.

A rotor 2b is attached on an outer circumference of the bushing 8, while a stator 2c is coupled to an inner circumference of the frame 2a and extended toward the rotor 2b.

In the above described motor 2, the dynamic pressure bearing 9 comprising the supporting shaft 3, the hemispheres 5 and 4, and the bushing 8 has gaps defined between the hemispheres 5 and 4 and the hemispherical grooves 8b and 8a, which can be adjusted by adjusting the distance between the sliding hemisphere 5 and the fixed hemisphere 4.

However, if the hemispherical dynamic pressure bearing is assembled incorrectly or is used for a long time, an improper gap may result. If the bearing is further used in this state, wherein the hemispheres contact the hemispherical grooves, the contacting surfaces become worn, thereby generating noise or forming dynamic pressure ineffectively. Therefore, in such a case, the gaps between the hemispherical grooves and the hemispheres should be adjusted by replacing the sleeve 6 with a sleeve of different length.

However, in the prior bearing, since the sleeve is retained by the fixing ring 7, it is necessary to disassemble the bearing and detach the sleeve, in order for a sleeve of different length to be inserted. Then, the parts must be reassembled which is a troublesome and time-consuming task.

SUMMARY OF THE INVENTION

The present invention has been made in an effort to solve the above problems.

It is an object of the present invention to provide a hemispherical dynamic bearing which has a gap adjuster for adjusting a distance between a fixed bearing and a sliding bearing, thereby adjusting gaps between the hemispherical grooves and the respective hemispheres.

To achieve the above object, the present invention provides a hemispherical dynamic pressure bearing comprising a supporting shaft defining an axis; a fixed hemisphere fixed on a first end of the supporting shaft; a sliding hemisphere slidably disposed on a second end of the supporting shaft; an elastic member disposed around the supporting shaft between the fixed and sliding hemispheres; a bushing having first and second hemispherical grooves in which the fixed and sliding hemispheres are disposed, respectively, and a communicating hole for communicating the first and second hemispherical grooves with each other and for receiving the shaft. A gap adjuster is connected to the shaft for adjusting a gap between the sliding hemisphere and the first hemispherical groove, and a gap between the fixed hemisphere and the second hemispherical groove.

According to one aspect of the present invention, the gap adjuster comprises a screw thread formed on the second end of the supporting shaft and a nut coupled to the screw thread. Preferably, said gap adjuster further comprises a washer disposed between the nut, and the sliding hemisphere.

According to another aspect of the present invention, the gap adjuster comprises a screw thread formed in the supporting shaft and a bolt coupled to the screw thread. Preferably, the bolt comprises an inserting portion screwed into the screw thread and a head portion facing a planar surface of the sliding hemisphere.

BRIEF DESCRIPTION OF THE DRAWINGS

The objects and advantages of the invention will become apparent from the following detailed description of the preferred embodiments thereof, in connection with the accompanying drawing, in which like numerals designate like elements, and in which.

DETAILED DESCRIPTION OF PREFERRED EMBODIMENTS OF THE INVENTION

Preferred embodiments of the present invention will now be described in detail with reference to the accompanying drawings.

Figure 1:
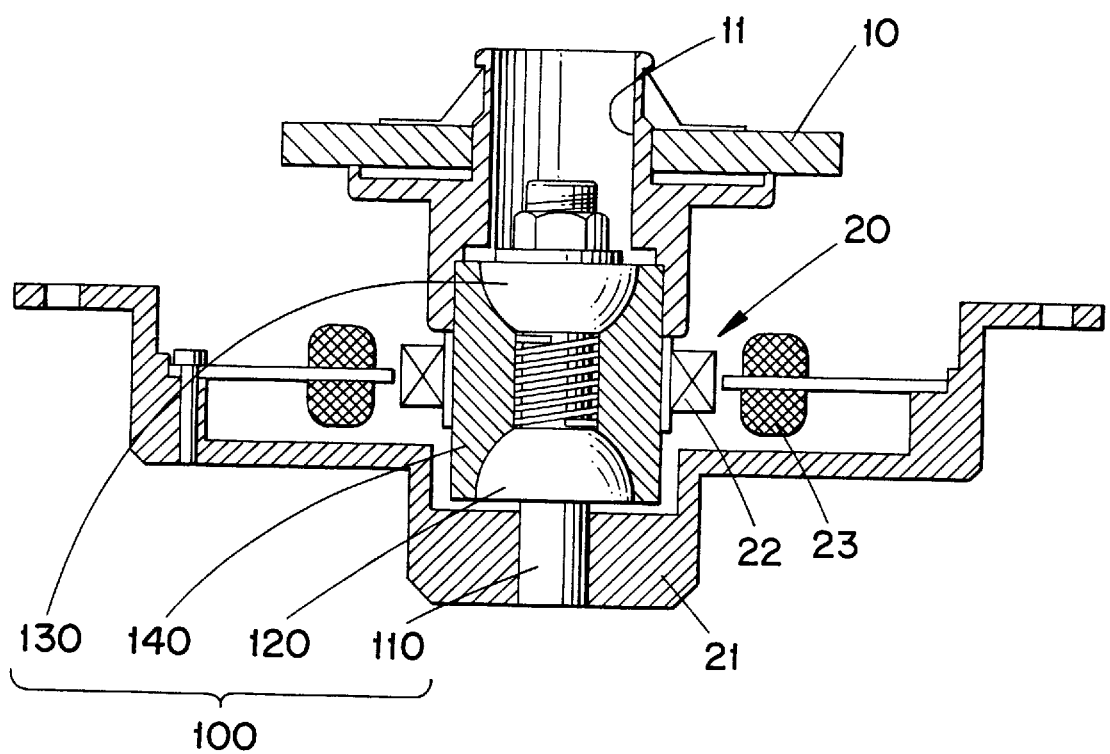
FIG. 1 is a longitudinal sectional view of a motor having a hemispherical dynamic pressure bearing-according to a first preferred embodiment of the present invention.

Referring to FIG. 1, there is shown a sectional view illustrating a motor 20 where a hemispherical dynamic pressure bearing according to a preferred embodiment of the present invention is employed.

As shown in FIG. 1, there is provided a multi-faceted mirror 10 and the motor 20 for rotating the multifaceted mirror.

The inventive hemispherical bearing 100 is received in a frame 21. A supporting shaft 110 is coupled on a center of the frame 21 and extends upward. A sliding hemisphere 130 is slidably mounted on the shaft 110, and a fixed hemisphere 120 is fixedly mounted on the supporting shaft 110. A bushing 140 is mounted on the hemispheres. The bushing 140 has hemispherical grooves 160 and 150 corresponding to outer circumferences of the hemispheres 130 and 120 and a center hole 170 through which the supporting shaft 110 extends (see FIG. 2).

Figure 2:
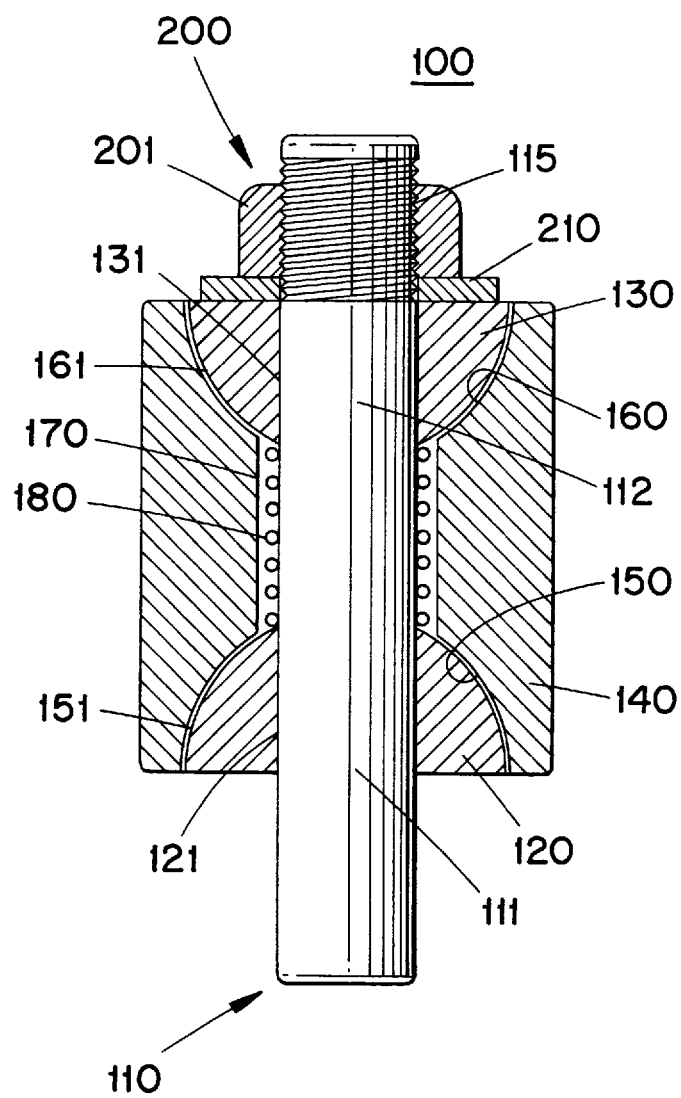
FIG. 2 is an enlargement of a portion of FIG. 1.

Referring to FIG. 2, there is shown a sectional view of a hemispherical dynamic bearing according to a first embodiment of the present invention.

Disposed around the supporting shaft 110 are the sliding and fixed hemispheres 130 and 120, respectively provided with axial holes 131 and 121 through which the supporting shaft 110 is inserted.

That is, the sliding hemisphere 130 is slidably disposed on the supporting shaft 110, while the fixed hemisphere 120 is snugly disposed on the supporting shaft 110 and is situated under the sliding hemisphere 130.

The sliding and fixed hemispheres 130 and 120 are arranged such that their planar surfaces are directed upward and downward, respectively. An elastic compression spring 180 is disposed around the supporting shaft 110 between the sliding and fixed hemispheres 130 and 120 in a compressed state, so as to bias the sliding hemisphere 130 upward.

There is provided a gap adjuster 200 for adjusting gaps between the sliding hemisphere 130 and the fixed hemisphere 120. The gap adjuster 200 comprises a screw thread 115 formed on the outside of an upper end of the supporting shaft 110 and a nut 201 coupled to the screw thread 115.

A pitch distance of the screw thread 115 is designed to be minimized such that the nut 201 can be moved by minute increments in the axial direction. The gap adjuster 200 further comprises a washer 210 disposed between the sliding hemisphere 130 and the nut 201.

The bushing 140 is disposed around the supporting shaft 110 and the hemispheres 130 and 120. The bushing 140 is provided with the hemispherical grooves 160 and 150 having shapes corresponding to the hemispheres 130 and 120, respectively. The hemispherical grooves 160 and 150 communicate with each other through a communicating hole 170 in which the elastic member 180 is disposed.

In the hemispherical dynamic pressure bearing 100 structured as described above, when the sizes of the gaps 161 and 151 between the hemispheres 130 and 120 and the hemispherical grooves 160 and 150 are above a predetermined value, the nut 201 of the gap adjustor 200 can be rotated for displacing the sliding hemisphere 130 downwardly against the bias of spring 180.

As a result, the distance between the hemispheres 130 and 120 is reduced, thereby reducing the sizes of the gaps 161 and 151 between the hemispheres 130 and 120 and the hemispherical grooves 160 and 150.

In addition, when the sizes of the gaps 161 and 151 between the hemispheres 130 and 120 and the hemispherical grooves 160 and 150 are lower than a predetermined value, the nut 201 can be rotated in an opposite direction, the sizes of the gaps 161 and 151 are increased.

A rotor 22 is attached on an outer circumference of the hemispherical bushing 140, while a stator 23 is coupled to an inner circumference of the frame 21 and extended toward the rotor 22.

Figure 3:
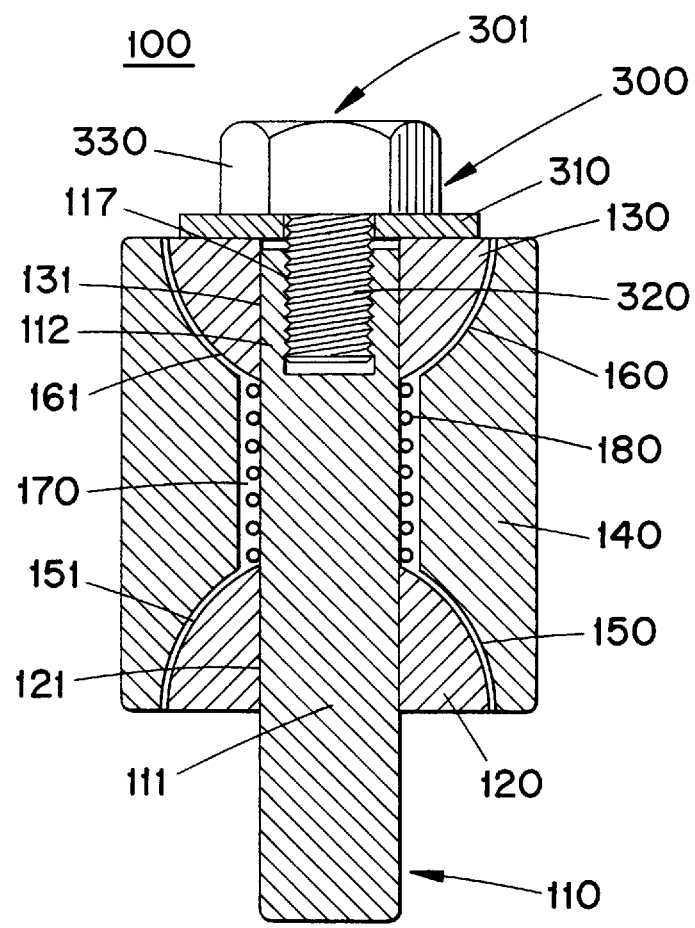
FIG. 3 is a longitudinal sectional view of a hemispherical dynamic pressure bearing according to a second embodiment of the present invention.
Figure 4:
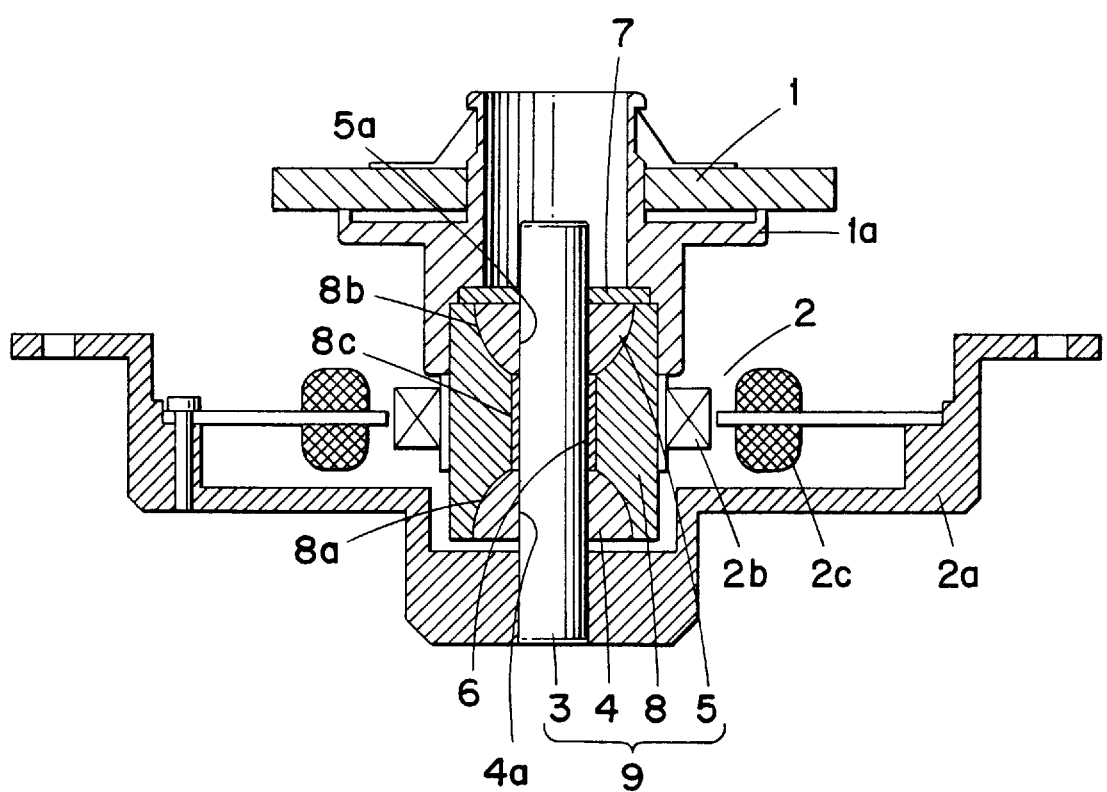
FIG. 4 is a longitudinal sectional view of a motor having a prior hemispherical dynamic pressure bearing.

Referring to FIG. 3, there is shown a sectional view of a hemispherical dynamic bearing according to a second embodiment of the present invention.

Since the hemispherical dynamic bearing according to this second embodiment is similar to that of the first embodiment, the description of the same parts will be omitted herein.

The gap adjustor 300 of this embodiment comprises an internal screw thread 117 formed in the supporting shaft 110 and a bolt 301 coupled to the thread 117. The bolt 301 includes a stem portion 320 screwed into the thread 117 and a head portion 330 facing the planar surface of the sliding hemisphere 130. The gap adjustor 300 further comprises a washer 310 disposed between the head portion 330 and the sliding hemisphere 130.

As a result, the gap adjustor 300 depresses the sliding hemisphere 130 downward, while the elastic spring 180 biases the same upward.

Therefore, by rotating the bolt 301, the gaps 161 and 151 can be adjusted.

As described above, even when the hemispherical dynamic pressure bearing is assembled incorrectly or is used for a long time, thereby resulting in a misaligning of the set gap, since the gap can be easily adjusted, the bearing can be always used in an optimal state.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A hemispherical dynamic pressure bearing comprising:
   a supporting shaft defining an axis;
   a fixed hemisphere fixed on a first end of the supporting shaft;
   a sliding hemisphere slidably disposed on a second end of the supporting shaft;
   an elastic member disposed around the supporting shaft between the fixed and sliding hemispheres for biasing the fixed and sliding hemispheres apart;

a bushing having first and second hemispherical grooves in which the fixed and sliding hemispheres are disposed, respectively, and a communicating hole for communicating the first and second hemispherical grooves with each other and receiving the supporting shaft; and a gap adjuster connected to the shaft for adjusting a gap between the sliding hemisphere and the first hemispherical groove and a gap between the fixed hemisphere and the second hemispherical groove.

2. The hemispherical dynamic pressure bearing of claim 1 wherein the gap adjuster comprises means for applying a variable force on the sliding hemisphere to compress the elastic member.

3. The hemispherical dynamic pressure bearing of claim 2, wherein said gap adjuster comprises a screw thread formed on the second end of the supporting shaft and a nut coupled to the screw shaft.

4. The hemispherical dynamic pressure bearing of claim 3, wherein said gap adjuster further comprises a washer disposed between the nut and the sliding hemisphere.

5. The hemispherical dynamic pressure bearing of claim 2, wherein said gap adjuster comprises a screw thread formed in the supporting shaft and a bolt coupled to the screw thread.

6. The hemispherical dynamic pressure bearing of claim 5, wherein the bolt comprises a stem screwed into the screw thread and a head portion facing a planar surface of the sliding hemisphere.

7. The hemispherical dynamic pressure bearing of claim 5, wherein the gap adjuster further comprises a washer disposed between the head portion and the sliding hemisphere.

8. The hemispherical dynamic pressure bearing of claim 1 wherein the gap adjuster is operable to axially displace the shaft and fixed hemisphere relative to the slidable hemisphere.

9. The hemispherical dynamic pressure bearing of claim 1, further including a rotor fixed to the bushing, and an electrical stator surrounding the rotor for rotating the rotor and bushing.

* * * * *